UNITED STATES PATENT OFFICE.

STANLEY SEVERIN SÖRENSEN AND GEORGE C. WESTBY, OF MURRAY, UTAH.

PROCESS OF TREATING PRECIOUS-METAL-BEARING MATERIAL.

No. 914,680.  Specification of Letters Patent.  Patented March 9, 1909.

Application filed March 30, 1906. Serial No. 308,870.

*To all whom it may concern:*

Be it known that we, STANLEY SEVERIN SÖRENSEN and GEORGE CUTLER WESTBY, the latter a citizen of the United States and the former a British subject, and residents of Murray, county of Salt Lake, and State of Utah, have invented new and useful Improvements in Processes for Treating Precious-Metal-Bearing Material, of which the following is a specification.

Our invention relates to a method of recovering the valuable metals contained in solutions obtained by treating copper ores in the wet way, and the object of the same is to lessen the cost of production and simplify the operation of extraction. The ores which can be treated by this process are sulfids, oxids and carbonates, and it is primarily adapted for the treatment of solutions which are formed from the treatment of copper ores by dissolving the same in solutions of sulfur dioxid, sulfuric acid or a mixture of ferric sulfate with the reagents mentioned, the essential feature of its applicability being that the metals to be recovered are in solution either as sulfates, sulfites, dissolved thionous salt or any mixture of these salts.

In the ordinary process of treating copper ores by sulfuric or sulfurous acid, if the copper be present in the ores in the form of oxids and carbonates, they are subjected to the treatment by the acid without roasting. In case the copper exists in the form of sulfid, the ores are first roasted in any convenient form of furnace. They are then treated with the solution of acids, by any of the means above indicated, in vats or agitators whereby the oxids, carbonates or sulfates of the metal to be extracted, are brought into solution as sulfates and sulfites.

Now we have discovered that after the supernatant liquor from the solution tank or settling vessels is decanted or filtered, if crushed iron matte be added to it or it be passed through or over crushed iron or copper matte, or it be passed through or over crushed iron or copper matte, the copper, or other precipitable metals which it is desired to save, are thereby thrown down in metallic form.

After the precipitation is effected, the supernatant liquor is then drawn off from the tank in which the precipitation is effected, and the precipitate or valuable metals treated in any desired manner.

We claim as our invention:

1. The hereinbefore described method of separating the valuable constituents from a solution derived by the treatment of copper ores in the wet way consisting in bringing the solution in contact with crushed substances containing sulfid of iron of the form occurring in mattes whereby the valuable portions are precipitated.

2. The hereinbefore described method of separating the valuable constituents from a solution derived by the treatment of copper ores in the wet way, consisting in bringing the solution in contact with crushed copper matte whereby the valuable portions are precipitated.

In testimony, that we claim the foregoing as our invention, we have signed our names in presence of two witnesses, this twenty-fourth day of March, 1906.

STANLEY SEVERIN SÖRENSEN.
GEORGE C. WESTBY.

Witnesses:
J. R. HAAS,
R. B. HARKNESS.